(12) United States Patent
Bathiche (10) Patent No.: US 8,964,008 B2
(45) Date of Patent: Feb. 24, 2015

(54) VOLUMETRIC VIDEO PRESENTATION

(75) Inventor: Steven Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/163,407

(22) Filed: Jun. 17, 2011

(65) Prior Publication Data

US 2012/0320169 A1 Dec. 20, 2012

(51) Int. Cl.
| | |
|---|---|
| H04N 9/47 | (2006.01) |
| H04N 13/04 | (2006.01) |
| G06F 3/01 | (2006.01) |
| G02B 27/01 | (2006.01) |

(52) U.S. Cl.
CPC ......... H04N 13/044 (2013.01); H04N 13/0497 (2013.01); G02B 2027/0187 (2013.01); G02B 2027/014 (2013.01); G06F 3/013 (2013.01); H04N 13/0468 (2013.01); G02B 27/017 (2013.01); G02B 2027/0134 (2013.01); H04N 13/0484 (2013.01); G06F 3/011 (2013.01); G06F 3/012 (2013.01)
USPC ..................................... 348/53; 348/E13.075

(58) Field of Classification Search
CPC .................... H04N 13/044; H04N 13/0497
See application file for complete search history.

(56) References Cited

U.S. PATENT DOCUMENTS

| | | | |
|---|---|---|---|
| 5,696,892 A | 12/1997 | Redmann et al. | |
| 6,317,103 B1 | 11/2001 | Furness et al. | |
| 7,605,961 B2 | 10/2009 | Klug et al. | |
| 7,843,449 B2 | 11/2010 | Krah | |
| 2002/0015522 A1 | 2/2002 | Rogina et al. | |
| 2002/0036649 A1 | 3/2002 | Kim et al. | |
| 2004/0128012 A1 | 7/2004 | Lin | |
| 2005/0017924 A1 | 1/2005 | Utt et al. | |
| 2005/0020910 A1* | 1/2005 | Quadling et al. ............. 600/424 |

(Continued)

FOREIGN PATENT DOCUMENTS

KR 1020110025674 A 3/2011

OTHER PUBLICATIONS

"Provision Interactive Adds Gesture Recognition to 3D Display Platform", Retrieved at <<http://www.digitalsignageexpo.net/DN-NArticleMaster/DNNArticleView/tabid/78/ArticleId/4326/Provision-Interactive-Adds-Gesture-Recognition-to-3D-Display-Platform.aspx>>, Feb. 7, 2011, pp. 2.

(Continued)

*Primary Examiner* — Dave Czekaj
*Assistant Examiner* — Nam Pham
(74) *Attorney, Agent, or Firm* — Jim Banowsky; Kate Drakos; Micky Minhas (57) ABSTRACT

Various embodiments are disclosed that relate to the presentation of video images in a presentation space via a head-mounted display. For example, one disclosed embodiment comprises receiving viewer location data and orientation data from a location and orientation sensing system, and from the viewer location data and the viewer orientation data, locate a viewer in a presentation space, determine a direction in which the user is facing, and determine an orientation of the head-mounted display system. From the determined location, direction, and orientation, a presentation image is determined based upon a portion of and an orientation of a volumetric image mapped to the portion of the presentation space that is within the viewer's field of view. The presentation image is then sent to the head-mounted display.

20 Claims, 6 Drawing Sheets

(56) References Cited

U.S. PATENT DOCUMENTS

| | | | |
|---|---|---|---|
| 2005/0028111 A1* | 2/2005 | Schrag et al. | 715/851 |
| 2006/0176242 A1* | 8/2006 | Jaramaz et al. | 345/7 |
| 2010/0017047 A1* | 1/2010 | Sanders-Reed | 701/3 |
| 2010/0110368 A1 | 5/2010 | Chaum | |
| 2010/0128112 A1 | 5/2010 | Marti et al. | |
| 2011/0115887 A1* | 5/2011 | Yoo et al. | 348/51 |
| 2012/0274750 A1* | 11/2012 | Strong | 348/52 |

OTHER PUBLICATIONS

Reichelt, et al., "Large Holographic 3D Displays for Tomorrow's TV and Monitors—Solutions, Challenges, and Prospects", Retrieved at <<http://seereal.biz/en/holography/papers/IEEE%20LEOS%202008%20-%20Large%20Holographic%203D%20Displays%20for%20Tomorrow%27s%20TV%20and%20Monitors%20-%20Web.pdf>>, Proceedings of 21st Annual Meeting of the IEEE Lasers and Electro-Optics Society, Nov. 9-13, 2008, pp. 3.

Elmorshidy, Ahmed, "Holographic Projection Technology: The World is Changing", Retrieved at <<http://arxiv.org/ftp/arxiv/papers/1006/1006.0846.pdf>>, Journal of Telecommunications, vol. 2 No. 2, May 2010, pp. 9.

Rauterberg, Matthias, "From Gesture to Action: Natural User Interfaces", Retrieved at <<http://citeseerx.ist.psu.edu/viewdoc/download?doi=10.1.1.129.9632&rep=rep1&type=pdf>>, 1999, pp. 15-25.

"Holographic Revolution Soon to Blast 3D Era", Retrieved at <<http://omgshots.com/1013-holographic-revolution-soon-to-blast-3d-era.html>>, Aug. 12, 2010, pp. 8.

"3D Stereoscopic & Holographic Displays", Retrieved at <<http://www.vorteximmersion.com/stereo.php>>, Retrieved Date: Mar. 9, 2011, pp. 2.

"What will Apple Come Up with Next?", Retrieved at <<http://www.quora.com/What-will-Apple-come-up-with-next>>, Retrieved Date: Mar. 9, 2011, pp. 10.

"International Search Report", Mailing Date: Feb. 26, 2013, Application No. PCT/US2012/042064, Filed Date: Jun. 12, 2012, pp. 9.

European Patent Office, Partial Supplementary European Search Report for European Patent Application No. 12800692.1, Nov. 12, 2014, 6 Pages.

* cited by examiner

VOLUMETRIC VIDEO PRESENTATION

BACKGROUND

Video content may be presented in two-dimensional or three-dimensional formats. Three-dimensional video presentation often involves the use of filtering eyewear to allow the delivery of slightly different images to a viewer's left eye and right eye. In such video presentations, while the displayed image appears to have three dimensions, changing user perspectives does not change the content being viewed, as the same images reach the viewer's eyes no matter the viewer's perspective within the viewing environment.

Virtual worlds and other interactive computer graphics presentations may allow a user to view different parts of a scene via user inputs that change a perspective of a first or third person character through which the scene is viewed. A user may control the perspective viewed in a virtual world or other computer graphics environment via inputs from a user input device, such as a keyboard, joystick, or the like.

SUMMARY

Various embodiments are disclosed that relate to the presentation of video images in a presentation space via a head-mounted display such that a user may view different perspectives of volumetric image data by changing perspective within the presentation space. For example, one disclosed embodiment comprises receiving viewer location data and orientation data from a location and orientation sensing system, and from the viewer location data and the viewer orientation data, locate a viewer in a presentation space, determine a direction in which the user is facing, and determine an orientation of the head-mounted display system. From the determined location, direction, and orientation, a presentation image for sending to the head-mounted display system is determined based upon a portion of and an orientation of a volumetric image mapped to the presentation space that is within the viewer's field of view based upon the viewer's field of view in the presentation space. The presentation image is then sent to the head-mounted display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, virtual worlds and other computer graphics presentations may allow a user to view different perspectives of a scene via user inputs that change a perspective of a first or third person character through which the scene is viewed. A user may control the perspective viewed in a virtual world or other computer graphics environment via inputs from a user input device, such as a keyboard, joystick, or the like.

However, a degree of interactivity that a player may enjoy with current virtual world experiences may be limited by a mechanism utilized to control user movement through the virtual world. For example, the use of a manual input device such as a keyboard, joystick, directional pad, etc. to navigate a virtual world prevents the user from enjoying a more realistic interactivity with the world, such as being able to walk within a virtual world scene to see different perspectives of the scene.

Moreover, as mentioned above, video presentations may not provide viewers the ability to change perspective within a video content item. For example, unlike computer graphics presentations, a video viewer may not have the ability to view action occurring behind a point of view of the video viewer by choosing to change the perspective by 180 degrees.

Therefore, embodiments are disclosed herein that relate to the presentation of video content in such a manner that a user may move within a video content presentation space to view a video content presentation from a variety of perspectives. For example, a viewer watching a football game may be able to walk within the viewing environment to get a closer view of a line of scrimmage of the game. Likewise, a viewer watching a drama presentation may be able to walk around a room in which a scene is taking place to view characters from different perspectives within the room.

The disclosed embodiments utilize a head-mounted display to display images to a viewer, and a location and orientation tracking system to track user motion and orientation within a presentation space. Such a location and orientation tracking system may comprise, for example, one or more cameras configured to image a presentation space, and/or one or more motion sensors on the head-mounted display to track an orientation of a user's head along roll, pitch and/or yaw axes.

A location and orientation tracking system also may comprise a camera beacon system. For example, an object in the presentation space may be configured to emit a reference signal that is spatially correlated and structured so that a camera on the head-mounted display system may see and track the structured light pattern. The image of the structured light pattern may then be used to determine a user location and orientation. In yet other embodiments, a single wide field-of-view camera may be provided in the presentation space, and the head-mounted display system emits a structurally spatially correlated beacon viewable by the camera to determine user location and orientation. A similar system may utilize radiofrequency beaconing. It will be understood that these location and orientation tracking systems are described for the purpose of example and are not intended to be limiting in any manner, and that any other suitable motion tracking system, such as magnetic systems, may be used.

From the location and orientation tracking system, data describing the position and orientation of the viewer's eyes in the presentation space may be obtained and used to calculate and render an image for display via the head-mounted display. Such a location and orientation analysis may be performed on a frame-by-frame basis, or only when motion of a user in the presentation space is detected. In either case, a user may be able to view a wide variety of perspectives of a video presentation by physically moving within the presentation space.

Such a system may allow video data to be presented within a presentation space, such as a room, by mapping volumetric video data to the presentation space. The term "volumetric video data" as used herein describes video data captured from a plurality of views such that the appearance and spatial relationships of objects in the video data may be appropriately rendered from various perspectives within the viewing volume. As a more specific example, a drama presentation may be recorded by cameras at a plurality of different angles, for example, substantially surrounding a sound stage. Then, image data from the cameras may be stitched together to form a video file that encompasses all image data within the range of perspectives captured by the plurality of cameras. Knowledge of the geometry of the content production space in which the drama presentation was captured by video may allow the production space to be mapped to the captured video data. Then, this mapping may be applied to the presentation space in which the video data is presented. In this manner, the volume of the presentation space may be filled with mapped video data, such that a viewer in the presentation space sees video content from any suitable perspective within the presentation space via the head-mounted display system. It will be understood that geometric mismatches between the presentation space and the content production space volume captured in the video data may be handled by cropping sides of the video content, by enabling users to scroll video content into and/or out of view at the edge of the presentation space (e.g. by gesture inputs detected by an image sensor or sensors), by limiting a portion of the video data volume in which a user may move (as opposed to view), and/or in any other suitable manner.

Figure 1:
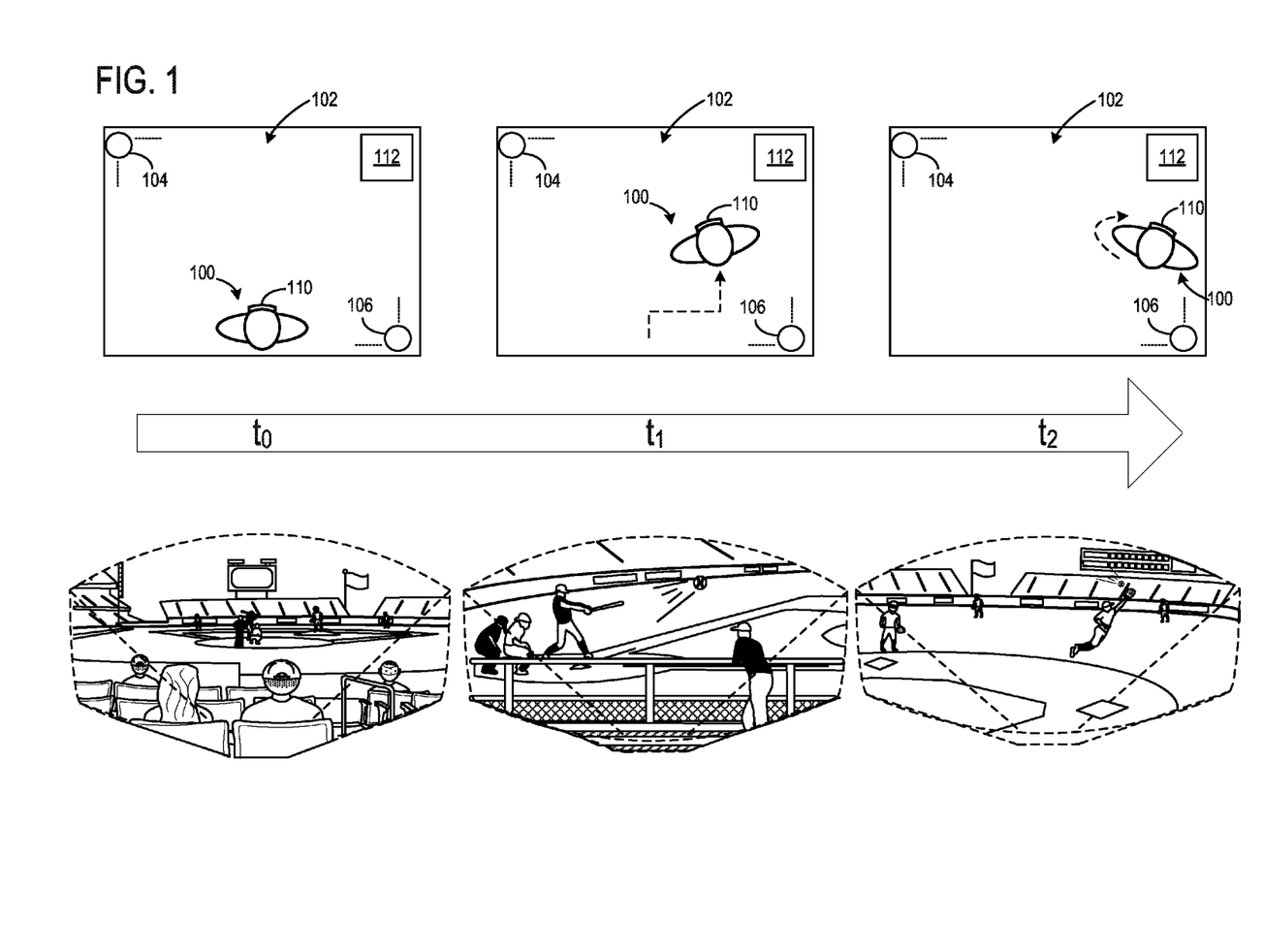
FIG. 1 shows a schematic depiction of a viewer in a presentation space, and also illustrates video images presented to the user as a function of the viewer's perspective within the presentation space according to an embodiment of the disclosure.

FIG. 1 depicts an example use scenario of such volumetric video presentation. A viewer 100 is depicted in a presentation space 102 that comprises a plurality of cameras 104, 106 located at various positions within the room. Cameras 104, 106 may be used to track the location of viewer 100 within presentation space 102. While two cameras are shown for the purpose of illustration, it will be understood that any suitable number of cameras may be used to track the location of viewer 100 within presentation space 102. It will further be understood that the presentation space may include any other suitable position and orientation tracking system, including but not limited to those described above.

Further, presentation space 102 comprises a head-mounted display system 110 worn by viewer 100 to view a volumetric image presentation. While a single viewer 100 is depicted for the purpose of example, it will be understood that multiple viewers may view video presentations within presentation space 102.

Presentation space 102 further comprises a video presentation computing device 112. Video presentation computing device 112 is configured to receive volumetric video data for a video presentation, and to map the volumetric video data to the presentation space. It will be understood that volumetric video data may be received from any suitable source, including but not limited to local sources such as a DVD player, and/or remote sources via a network.

Video presentation computing device 112 is further configured to receive viewer tracking image data from cameras 104, 106, as well as motion data from various sensors on head-mounted display system 110 (described below), to allow a position and an orientation of the eyes of viewer 100 in presentation space 102 to be tracked. Further, in some embodiments, input from an eyeball tracking camera on head-mounted display system 110 may provide input regarding a direction in which a viewer's gaze is directed. From these inputs, video presentation computing device 112 may determine an image to send to head-mounted display system 110 for presentation to viewer 100.

By performing such a process on a frame-by-frame basis, different images may be presented to the viewer as the viewer moves about within presentation space 102. For example, FIG. 1 depicts viewer 100 viewing a baseball game. In a first perspective at a time $t_0$, viewer 100 is positioned at a location that places a viewing perspective behind home plate. Next, at time $t_1$, viewer 100 has moved within presentation space 102 to a location and orientation that allows the baseball game to be viewed from along the first base line. Then, at $t_2$, viewer 100 has moved farther along the first base line and changed orientation to view a hit toward right field. In this manner, viewer 100 may be able to change a perspective from which the game is viewed simply by moving within presentation space 102. It will be appreciated that, depending on the mapping of the presentation space to the volumetric video data and a range of available perspectives in the volumetric data, a viewer may be able to change to a perspective on the baseball field, such as behind a pitcher or catcher, or to any other suitable perspective.

Figure 2:
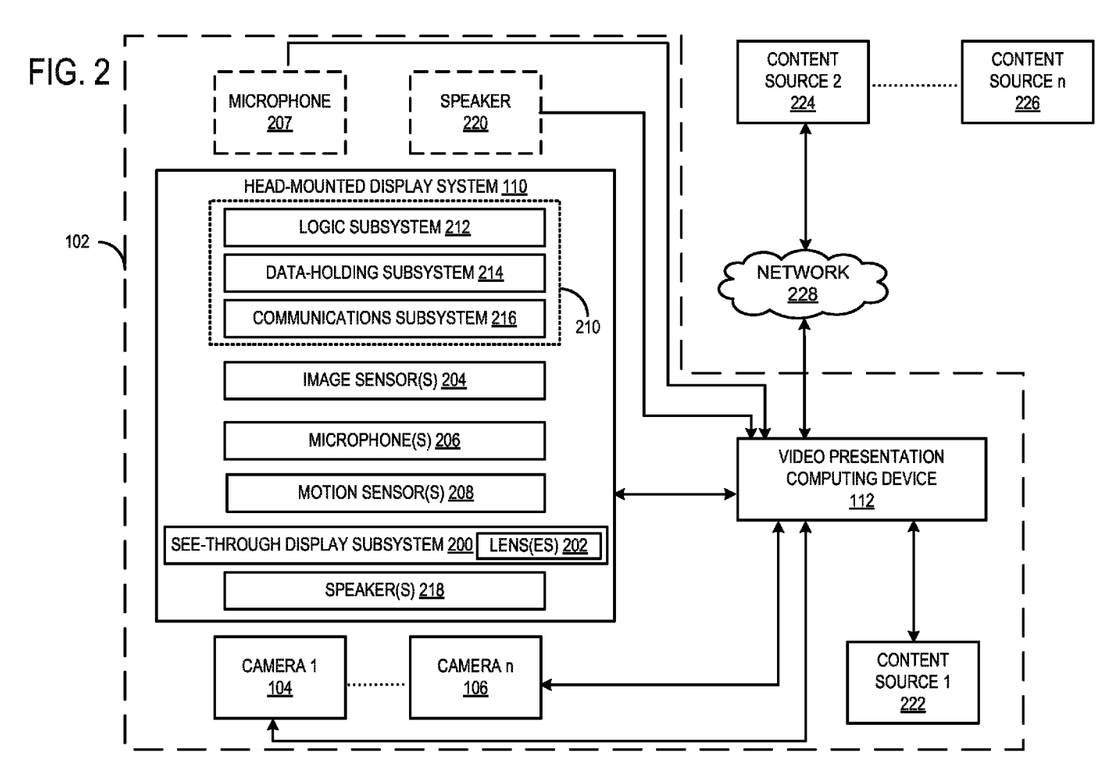
FIG. 2 shows a block diagram of an embodiment of a volumetric video presentation system.

FIG. 2 depicts a block diagram of the viewing environment of FIG. 1. Presentation space 102 of FIG. 1 is illustrated in dashed lines and is shown as including video presentation computing device 112. However, it will be understood that video presentation computing device 112, and/or any other suitable components, may be located physically separate from presentation space 102, as long as communications channels exist between video presentation computing device 112 and the various input sensors and output devices used in presentation space 102.

Head-mounted display system 110 may comprise various sensors and output devices. For example, head-mounted display system 110 may comprise a see-through display subsystem 200, such that images may be projected onto the lenses 202, or produced by image-producing elements (e.g. see-through OLED displays) located within lenses 202. Head-mounted display system 110 may further comprise one or more image sensors 204. For example, image sensors 204 may include eye tracking image sensors configured to acquire image data to allow a viewer's eyeballs to be tracked. Likewise, image sensors 204 may include one or more outward facing image sensors, for example, to enable gesture-based user inputs. In some embodiments, gesture-based user inputs also may be detected via presentation space cameras 104, 106, while in other embodiments gesture-based inputs may not be utilized. Head-mounted display system 110 may further comprise one or more microphones 206 to allow the use of voice commands as user inputs. Alternatively or additionally, a viewing environment microphone 207 separate from head-mounted display system 110 may be used to detect viewer voice commands.

Head-mounted display system 110 may further comprise one or more motion sensors 208 to detect movements of a viewer's head when the viewer is wearing head-mounted display system 110. Motion sensors 208 may output motion data for provision to video presentation computing device 112 for tracking viewer head motion and eye orientation. As such motion data may facilitate detection of tilts of the user's head along roll, pitch and/or yaw axes, such data also may be referred to as orientation data. Likewise, motion sensors 208 also may be employed as user input devices, such that a user may interact with head-mounted display system 110 via gestures of the neck and head, or even of the body. It will be understood that sensors illustrated in FIG. 2 are shown for the purpose of example and are not intended to be limiting in any manner, as any other suitable sensors and/or combination of sensors may be utilized.

Head-mounted display system 110 further comprises a controller 210 having a logic subsystem 212 and a data-holding subsystem 214 in communication with the various input and output devices of head-mounted display system 110. Data-holding subsystem 214 comprises instructions stored thereon that are executable by logic subsystem 212, for example, to receive and forward inputs from the sensors to video presentation computing device 112 (in unprocessed or processed form) via a communications subsystem 216, to receive image data from video presentation computing device 112, and to present such images to the viewer via the see-through display subsystem 200. Audio may be presented via one or more speakers 218 on head-mounted display system, or via another audio output 220 in the presentation space.

Figure 3:
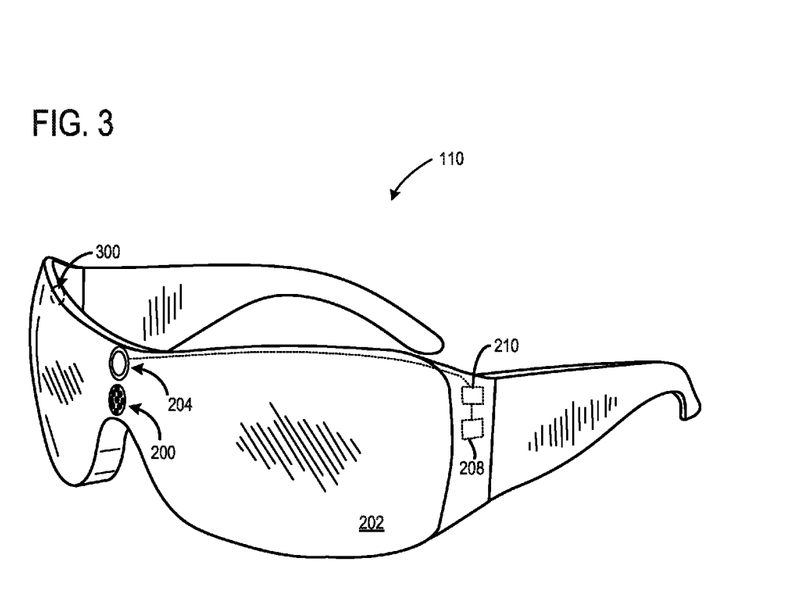
FIG. 3 shows an embodiment of a head-mounted display system.

Head-mounted display system 110 may have any suitable physical form. For example, in some embodiments, head-mounted display system 110 may take the form of a pair of sunglasses, as shown in FIG. 3. In other embodiments, head-mounted display system 110 may have any other suitable form in which a see-through display system is supported in front of a viewer's eye or eyes. It will be noted that FIG. 3 illustrates both an outwardly facing image sensor 204 as well as an eye-tracking image sensor 300.

Returning to FIG. 2, cameras 104, 106 of FIG. 1 are shown as camera 1 and arbitrary camera n, indicating that any suitable number of cameras, including but not limited to two, may be used to track user motion in presentation space 102 and to provide viewer location data to a video presentation computing device. Further, it will be understood that any other suitable location and orientation detection system may be used.

Where a plurality of cameras are utilized for viewer location tracking, the cameras may be calibrated to the presentation space in any suitable manner. In some embodiments, the cameras may be configured to self-calibrate. For example, each camera may include a structured light projection system that projects a structured light pattern into the presentation space. Such structured light pattern may then be detected by the camera to calibrate itself to the presentation environment. Then, to calibrate the locations of one camera to another camera in the presentation space, one camera may capture images while the camera emits a structured light pattern. The appearance and location of the structured light pattern in the image, along with knowledge of which camera emitted the structured light pattern, may then be used by the video presentation computing device to calibrate the overlap between images acquired by each camera. This may be performed for all camera pairs until the field of view overlap between each camera is determined.

Video presentation computing device 112 is depicted as communicating with head-mounted display system 110, cameras 104, 106, microphone 207, and audio output 220 within presentation space 102. Further, video presentation computing device 112 is depicted as receiving inputs from a plurality of content sources, including content source 1 222, located within presentation space 102, and content sources 2 224 and n 226, located external to presentation space 102.

Content source 222 may represent any suitable local content source, such as a DVD player, digital video recorder (DVR), or other such local media data source. Likewise, content sources 224, 226 may represent any remote content source that is accessible by video presentation computing device 112. For example, content sources 2 and/or n may represent websites from which volumetric video data may be streamed or downloaded. Likewise, content sources 224, 226 may represent any suitable remote media sources, such as a cable television provider, satellite television provider, a computer-network accessible streaming media provider, etc. As such, network 228 may represent any suitable network or networks over which content may be received from a remote source.

Figure 4:
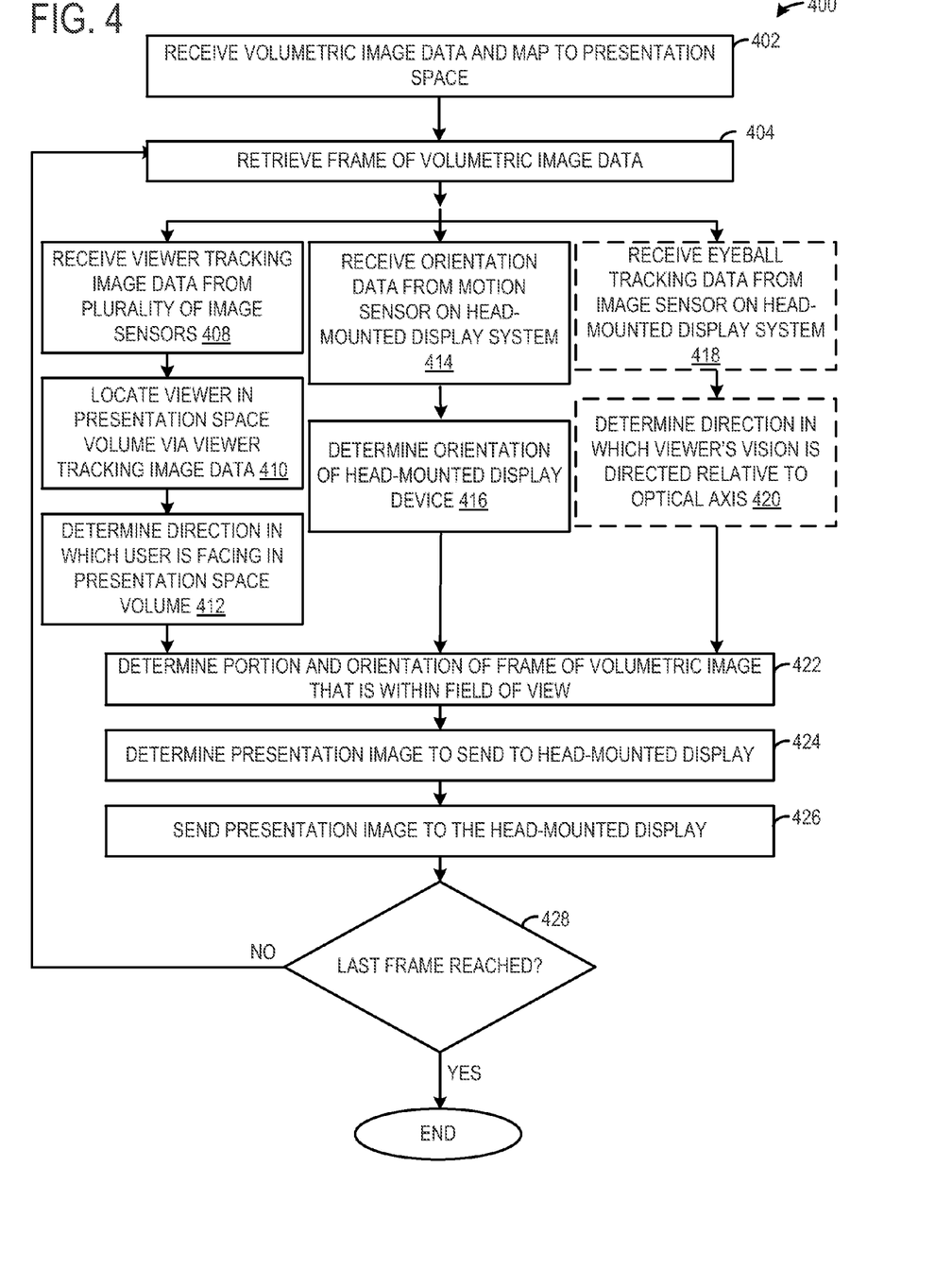
FIG. 4 shows a flow diagram depicting an embodiment of a method of presenting volumetric video images to a viewer.

FIG. 4 shows a flow diagram depicting an embodiment of a method 400 for presenting volumetric video data via a head-mounted display. It will be understood that, prior to performing method 400, a video presentation computing device may calibrate image sensors located in the presentation space to the volume of the presentation space. Such calibration may be performed in any suitable manner, and at any suitable frequency, including but not limited to at system setup.

Method 400 first comprises receiving volumetric image data and mapping the volumetric image data to the presentation space at 402. Such mapping may involve, for example, determining a portion of the volumetric image data that represents an area in the volumetric image in which the user may move about, and then associating pixels in that portion of the image with locations in the presentation space.

In some cases, an entire image volume may be interactive, such that a user can view objects in each image frame from any desired perspective. As a more specific example, a volumetric drama presentation may be recorded from a sufficient number of camera angles as to allow a user to walk around the perimeter of a displayed scene, as well as through the entire volume of the scene, and view images of actors from all perspectives within that area. In one specific example of such a presentation, the location of images of walls in the scene may correspond to the location of actual walls in the presentation space. It will be understood that the image may have any other suitable boundary appearance.

In other cases, only a portion of an image volume may be interactive, such that a user may not move to reveal some perspectives of the objects and/or persons in the volumetric video content.

After mapping the volumetric video data to the presentation space, method 400 comprises retrieving a frame of the volumetric video data at 404, and then performing various processes to determine an image to send to the head-mounted display for presentation to the viewer. For example, at 408, method 400 may comprise receiving viewer tracking data from image sensors in the presentation space, and at 410, locating a viewer in the presentation space via the tracking image data. It will be understood that multiple viewers in the presentation space may be identified in this manner. Likewise, the viewer tracking data also may be used to determine a direction in which the user is facing in the presentation space, as indicated at 412.

Further, data from motion sensors on the head-mounted display system may be used to help determine an image to present to the viewer. For example, as indicated at 414, method 400 may comprise receiving motion data from one or more motion sensors on the head-mounted display system, and then determining an orientation of the head-mounted display (and thus of the user's eyes) at 416.

In some embodiments, eyeball tracking data may be received from an image sensor on the head-mounted display system, as indicated at 418. Such data may then be used to determine a direction in which the viewer's vision is directed relative to an optical axis of the head-mounted display system that corresponds to the viewer looking straight ahead, as indicated at 420.

Next, based upon the viewer tracking data, orientation data, and/or eyeball tracking data, method 400 comprises, at 422, determining a portion and orientation of the current frame of volumetric video data that is within the viewer's field of view in the presentation space based upon the mapping of the presentation space to the video data. Then at 424, the video presentation computing device determines a presentation image to send to the head-mounted display system for presentation, and sends the image at 426. By performing processes 404 through 426 for each frame of volumetric video data, a volumetric video presentation may be presented to the viewer, as indicated at 428.

Figure 5:
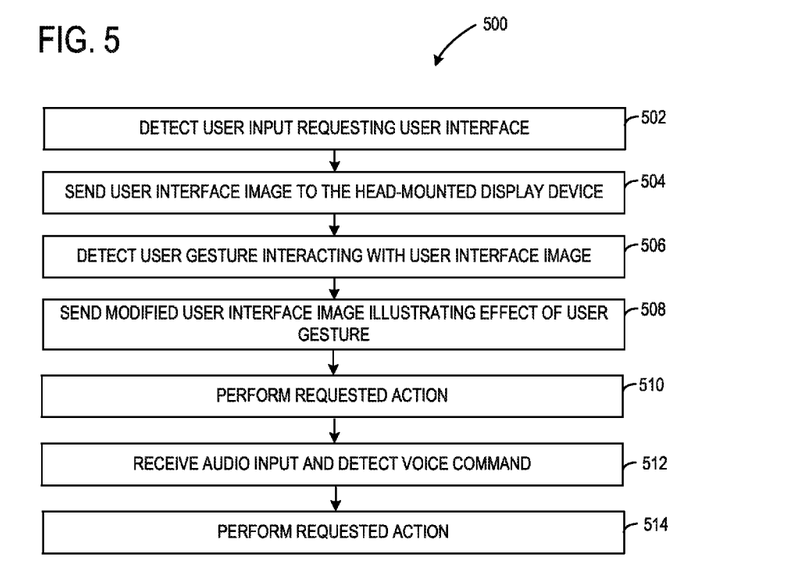
FIG. 5 shows a flow diagram depicting an embodiment of a method of presenting an interactive graphical user interface.
Figure 6:
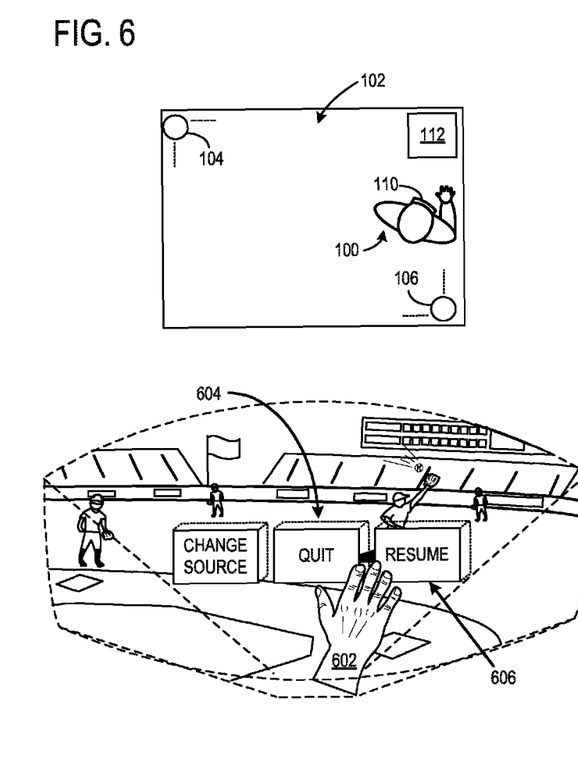
FIG. 6 shows an embodiment of an interactive visual interface prior to receiving a user interaction.
Figure 7:
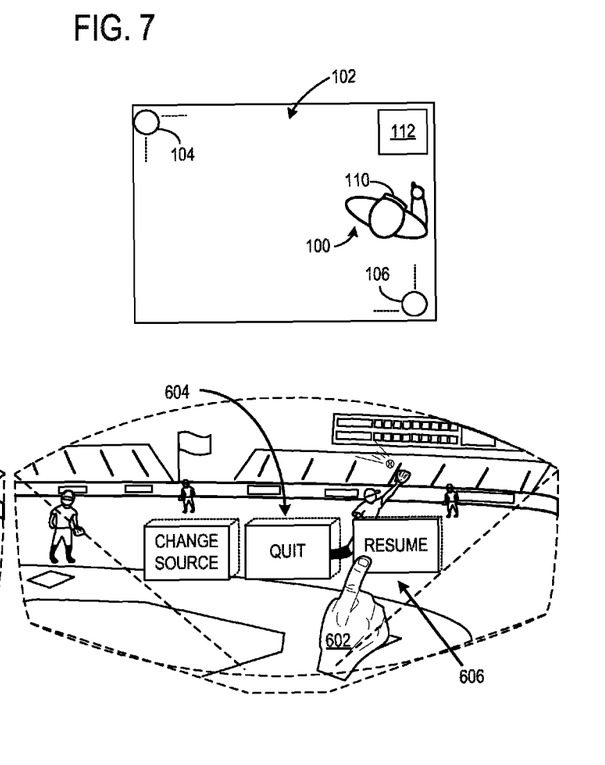
FIG. 7 shows the user interface of FIG. 6 after receiving a user interaction.

In some embodiments, an interactive graphical user interface also may be presented for a viewer, for example, to allow control of a video presentation. FIG. 5 shows a flow diagram depicting a method 500 of presenting a volumetric graphical user interface, and FIGS. 6 and 7 illustrate an example embodiment of such a user interface. Method 500 comprises, at 502, detecting a user request for a graphical user interface, and at 504, sending a user interface image to the head-mounted display system. A user may request a graphical user interface in any suitable manner. For example, referring to FIG. 6, a user requests a user interface by performing a gesture such as extending a hand 602 forward in a particular posture. In response, a graphical user interface 604 comprising a plurality of pushable elements, such as button 606, are displayed within apparent arm's reach of the user. It will be understood that any suitable type of user interface element may be presented, including but not limited to pushable, pullable, translatable, rotatable, etc. elements. Further, it will be understood that hand 602 may represent an actual hand of a user as seen through the head-mounted display system, or may represent an avatar displayed to the user as part of the user interface image and that is configured to track the motion of the user's actual hand.

Method 500 next comprises, at 506, detecting a user gesture interacting with the user interface image. In response, method 500 comprises, at 508, sending a modified user interface image that illustrates an effect of the user gesture, and at 510, performing the requested action. For example, referring to FIG. 7, the user interacts with the user interface image by extending a finger and pressing button 606. In response, the button is illustrated in an activated state (e.g. as pressed compared to the other buttons or in any other suitable visually contrasting manner compared to the other buttons).

In some embodiments, a user may interact with video presentation computing device 112 via voice commands, in addition to or instead of via gestures. Thus, method 500 comprises, at 512, receiving an audio input and detecting a voice command in the audio input, and at 514, performing the action requested in the audio input. The audio input may be received via a microphone located on the head-mounted display, or located elsewhere in the presentation space. It will further be understood that a user may interact with the video presentation computing device in any other suitable manner.

It will be understood that the video presentation may be displayed in various ways during a user interface interaction. For example, referring to FIGS. 6 and 7, the video presentation is illustrated as being paused during user interface action. In other instances, the video presentation may continue, or may not be displayed at all.

The presentation of video content as described herein may thus allow for a more immersive experience than current video content presentation methods, and may allow each viewer to choose a perspective of most interest to that viewer.

In some embodiments, the above described methods and processes may be tied to a computing system including one or more computers, such as video presentation computing device 112. In particular, the methods and processes described herein may be implemented as a computer application, computer service, computer API, computer library, and/or other computer program product.

Figure 8:
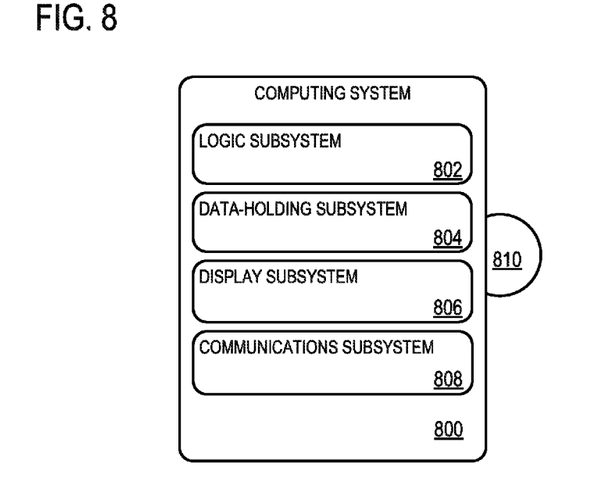
FIG. 8 shows an example embodiment of a computing device.

FIG. 8 schematically shows a nonlimiting computing system 800 that may perform one or more of the above described methods and processes. Computing system 800 is shown in simplified form. It is to be understood that virtually any computer architecture may be used without departing from the scope of this disclosure. In different embodiments, computing system 800 may take the form of a mainframe computer, server computer, desktop computer, laptop computer, tablet computer, home entertainment computer, network computing device, mobile computing device, mobile communication device, gaming device, etc.

Computing system 800 includes a logic subsystem 802 and a data-holding subsystem 804. Computing system 800 may optionally include a display subsystem 806, communication subsystem 808, and/or other components not shown in FIG. 8. Computing system 800 may also optionally include user input devices such as keyboards, mice, game controllers, cameras, microphones, and/or touch screens, for example.

Logic subsystem 802 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 804 may include one or more physical, non-transitory devices configured to hold data and/or instructions executable by the logic subsystem to implement the herein described methods and processes. When such methods and processes are implemented, the state of data-holding subsystem 804 may be transformed (e.g., to hold different data).

Data-holding subsystem 804 may include removable media and/or built-in devices. Data-holding subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 804 may include devices with one or more of the following characteristics: volatile, nonvolatile, dynamic, static, read/write, read-only, random access, sequential access, location addressable, file addressable, and content addressable. In some embodiments, logic subsystem 802 and data-holding subsystem 804 may be integrated into one or more common devices, such as an application specific integrated circuit or a system on a chip.

FIG. 8 also shows an aspect of the data-holding subsystem in the form of removable computer-readable storage media 810, which may be used to store and/or transfer data and/or instructions executable to implement the herein described methods and processes. Removable computer-readable storage media 810 may take the form of CDs, DVDs, HD-DVDs, Blu-Ray Discs, EEPROMs, and/or floppy disks, among others.

It is to be appreciated that data-holding subsystem 804 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 800 that is implemented to perform one or more particular functions. In some cases, such a module, program, or engine may be instantiated via logic subsystem 802 executing instructions held by data-holding subsystem 804. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 806 may be used to present a visual representation of data held by data-holding subsystem 804. As the herein described methods and processes change the data held by the data-holding subsystem, and thus transform the state of the data-holding subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or data-holding subsystem 804 in a shared enclosure, or such display devices may be peripheral display devices, such as the aforementioned head-mounted display system.

When included, communication subsystem 808 may be configured to communicatively couple computing system 800 with one or more other computing devices. Communication subsystem 808 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 800 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising:
a logic subsystem; and
a data-holding subsystem comprising instructions stored thereon that are executable by the logic subsystem to
receive viewer location data and viewer orientation data from a location and orientation sensing system comprising one or more motion sensors located on a head-mounted display system in a presentation space and one or more image sensors in the presentation space that are not located on the head-mounted display system;
from the viewer location data and the viewer orientation data, locate a viewer in the presentation space, determine a direction in which the viewer is facing in the presentation space, and determine an orientation of the head-mounted display system in the presentation space;
determine a presentation image to send to the head-mounted display system by determining a portion of, and an orientation of, a volumetric image mapped to a portion of the presentation space that is within the viewer's field of view based upon the viewer location data and the viewer orientation data, the presentation image corresponding to a first perspective of an object in the volumetric image;
send the presentation image to the head-mounted display system;
detect a change in the viewer location data and the viewer orientation data; and
determine a different presentation image to send to the head-mounted display system based on the change detected in the viewer location data and the viewer orientation data, the different presentation image corresponding to a second, different perspective of the object in the volumetric image.

2. The computing device of claim 1, wherein the instructions are further executable to receive eyeball tracking data from an eyeball tracking image sensor on the head-mounted display system and to further determine the presentation image based upon the eyeball tracking data.

3. The computing device of claim 1, wherein the instructions are further configured to receive an input of the volumetric image and to map the volumetric image to the presentation space.

4. The computing device of claim 1, wherein the volumetric image comprises video image data of a scene captured from a plurality of angles.

5. The computing device of claim 1, wherein the instructions are further executable to detect roll, pitch, and yaw of the head-mounted display system from the viewer orientation data.

6. The computing device of claim 1, wherein the instructions are further executable to:
   detect a user input requesting a user interface;
   determine a user interface image to send to the head-mounted display system for display, the user interface image comprising a user interface element;
   send the user interface image to the head-mounted display;
   detect a user gesture interacting with the user interface image; and
   in response, send a modified user interface image that illustrates an effect of the user gesture on the user interface image.

7. The computing device of claim 6, wherein the user interface element comprises a pushable and/or pullable element.

8. The computing device of claim 1, wherein the instructions are executable to detect a plurality of viewers in the presentation space, and to determine different images to send to each of the plurality of viewers based upon a location of each viewer in the presentation space.

9. The computing device of claim 1, wherein the instructions are further executable to receive an audio input, to detect a voice command in the audio input, and to perform a function in response to the audio input.

10. A system for presenting volumetric video image content in a presentation space, the system comprising:
    a plurality of image capture devices configured to capture images of the presentation space;
    a head-mounted display system comprising one or more motion sensors configured to detect tilt along a plurality of axes; and
    a computing device comprising a logic subsystem and a data-holding subsystem comprising instructions stored thereon that are executable by the logic subsystem to receive an input of volumetric video image data,
       map the volumetric video image data to the presentation space to produce a mapping of the volumetric video image data to the presentation space by associating pixels of the volumetric video image data with locations in the presentation space;
       receive viewer tracking image data from the plurality of image capture devices;
       receive motion data from the one or more motion sensors on the head-mounted display system;
       from the viewer tracking image data and the motion data, locate a viewer in the presentation space and determine a direction in which the viewer is facing in the presentation space;
       from the motion data, determine an orientation of the head-mounted display system in the presentation space;
       determine a presentation image to send to the head-mounted display system by determining a portion of, and an orientation of, the volumetric video image data mapped to a portion of the presentation space that is within the viewer's field of view based upon the viewer tracking image data and the motion data, the presentation image corresponding to a first perspective of an object in the volumetric video image data;
       send the presentation image to the head-mounted display system;
       detect a change in the viewer tracking image data and the motion data; and
       determine a different presentation image to send to the head-mounted display system based on the change detected in the viewer tracking image data and the motion data, the different presentation image corresponding to a second, different perspective of the object in the volumetric video image data.

11. The system of claim 10, wherein the head-mounted display system comprises an eyeball tracking sensor, and wherein the computing device is configured to receive eyeball tracking data from the head-mounted display system and to further determine the presentation image based upon the eyeball tracking data.

12. The system of claim 10, wherein the head-mounted display system comprises an outward facing head-mounted image sensor, and wherein the computing device is configured to receive image data from the outward facing head-mounted image sensor and to detect a user gesture based upon the image data from the outward facing head-mounted image sensor.

13. The system of claim 10, wherein the head-mounted display system comprises a microphone, and wherein the computing device is configured to receive audio data from the microphone and detect a voice command in the audio data.

14. The system of claim 10, wherein the instructions are further executable to:
    detect a user input requesting a user interface;
    determine a user interface image to send to the head-mounted display system for display, the user interface image comprising a user interface element;
    send the user interface image to the head-mounted display system;
    detect a user gesture interacting with the user interface image; and
    in response, send a modified user interface image that illustrates an effect of the user gesture on the user interface image.

15. A method of presenting volumetric video image data, the method comprising:
    receiving the volumetric video image data;
    mapping the volumetric video image data to a presentation space by associating pixels of the volumetric video image data with locations in the presentation space;
    receiving viewer tracking image data from a plurality of image capture devices;
    receiving motion data from one or more motion sensors on a head-mounted display system;
    locating a viewer in the presentation space via the viewer tracking image data and the motion data, and determining a direction in which the user is facing in the presentation space;
    from the motion data, determining an orientation of the head-mounted display system in the presentation space;
    receiving eyeball tracking data from an image sensor on the head-mounted display system;
    from the eyeball tracking data, determining a direction in which the viewer's vision is directed;
    determining a presentation image to send to the head-mounted display system by determining a portion of, and an orientation of, a volumetric image mapped to the presentation space that is within the viewer's field of view based upon the viewer tracking image data, the motion data, and the eyeball tracking data, the presentation image corresponding to a first perspective of an object in the volumetric video image data;
    sending the presentation image to the head-mounted display system;

detecting a change in the viewer tracking image data, the motion data, and the eyeball tracking data;

determining a different presentation image to send to the head-mounted display system based on the change in the viewer tracking image data, the motion data, and the eyeball tracking data, the different presentation image corresponding to a second, different perspective of the object in the volumetric video image data.

16. The method of claim 15, further comprising detecting a request to display a user interface, and in response, sending a user interface image to the head-mounted display system.

17. The method of claim 16, further comprising detecting a user gesture interacting with the user interface image, and in response, sending a modified user interface image that illustrates an effect of the user gesture on the user interface image.

18. The method of claim 16, wherein the request to display the user interface comprises a gesture detected via the image sensor located on the head-mounted display system.

19. The method of claim 15, further comprising receiving an audio input, detecting a voice command in the audio input, and performing a function in response to the audio input.

20. The method of claim 15, further comprising locating a plurality of viewers in the presentation space, determining images to send to each of the plurality of viewers based upon a location of each viewer in the presentation space, and sending to each viewer a corresponding image for display.

* * * * *